United States Patent [19]

Matsumoto

[11] Patent Number: 5,461,272
[45] Date of Patent: Oct. 24, 1995

[54] PLANAR MICRO-ACTUATOR

[75] Inventor: Hirofumi Matsumoto, Ushiku, Japan

[73] Assignee: Nippon Mektron, Ltd., Tokyo, Japan

[21] Appl. No.: 251,779

[22] Filed: May 31, 1994

[30] Foreign Application Priority Data

Oct. 28, 1993 [JP] Japan .................................. 5-292712

[51] Int. Cl.⁶ .................................................. H02N 1/00
[52] U.S. Cl. ............................................ 310/309; 310/12
[58] Field of Search ................................. 310/309, 310, 310/40 MM, 12, 308, 45

[56] References Cited

U.S. PATENT DOCUMENTS 5,235,225  10/1993  Colgate ................................ 310/309

FOREIGN PATENT DOCUMENTS

| 1007416 | 9/1953 | Germany | 310/309 |
| 0171173 | 7/1988 | Japan | 310/309 |
| 0744817 | 6/1980 | U.S.S.R. | 310/309 |

*Primary Examiner*—R. Skudy
*Attorney, Agent, or Firm*—Chilton, Alix & Van Kirk

[57] ABSTRACT

This invention provides a planar micro-actuator in which power feed to slider electrodes is facilitated, whose reliability is remarkably improved, and by which a sub-system can be reliably realized.

In a planar micro-actuator of the type wherein an insulating fluid is sealed between stators so disposed as to oppose each other with a predetermined gap and a slider is movably disposed between the stators, the stators are equipped with power feed paths, the slider is equipped with metal bumps in electrical contact with the power feed paths, and power is fed to the slider through the power feed paths and through the metal bumps. Guide grooves for guiding the metal bumps are preferably formed in the power feed paths, and each power feed path is disposed on the electrode of the stator through an insulating layer to thereby improve the wiring density. By such a structure, the size and weight of the planar micro-actuator can be reduced while preventing undesirable deviation of the slider.

6 Claims, 4 Drawing Sheets

PLANAR MICRO-ACTUATOR

BACKGROUND OF THE INVENTION

1. Field of the Invention

The present invention relates to a planar micro-actuator in which feed of power to slider electrodes is facilitated, the micro-actuator having, remarkably improved, reliability. This invention is also directed to a micro-actuator wherein a change in capacitance is used to produce a driving force.

2. Description of the Prior Art

In a planar micro-actuator utilizing a change in capacitance to generate a driving force, a capacitor must be formed physically by disposing electrodes on the opposed surfaces of a slider and the cooperating stators. Since the electrodes on the stator are fixed electrodes, they can easily be connected to an external power supply. However, since the electrodes on the slider move with the movement of the slider, their connection to an eternal power supply is extremely difficult.

For example, if a thin metal wire is used to connect the slider electrodes to the external power supply, viscous resistance to the movement of the slider due to the connection wire(s) acts as an adverse influence and since the actuator must always be connected to an external system, an integrated sub-system cannot be accomplished. These problems remarkably impede the realization of a micro-machine consisting of a combination of sub-systems, each sub-system comprising a planar micro-actuator.

A previously proposed method for solving the above-described problem does not use change in capacitance but uses a dielectric material having a dielectric constant and electric conductivity suitable for driving, such as plastic film, paper, etc, as the slider material, and utilizes electrostatic induction without disposing electrodes on the slider. In comparison with a micro-actuator which relies upon a capacitance change, however, a micro-actuator of this electrostatic induction type is not a synchronous motor because driving is effected only under the state where slip exists, and the driving force is physically small because the slip is not zero. For these reasons, this prior art method is not an actual solution.

Other problems of long standing in the art are as follows. Driving energy is stored in a gap between a slider and stators and because the lines of electric force change markedly in accordance with the gap, physical means for making the gap uniform is necessary. Further, a structure for reducing a contact area is necessary so as to reduce Coulomb friction between the slider and the stator. Furthermore, since any deviation of opposed electrodes between the slider and the stators in directions other than the moving direction of the slider, markedly reduces the driving force of the micro-actuator, a structure for preventing such deviation is also required.

Generally, a three-phase D.C. rectangular wave or A.C. traveling wave is used for driving a planar micro-actuator. Referring to FIG. 5, in order to achieve three-phase driving, a large number of electrodes 2 connected laterally to three-phase electrodes represented by symbols $\phi 1$, $\phi 2$ and $\phi 3$ and extending longitudinally, are required. The electrode $\phi 2$ is connected to the electrodes on the sides thereof through via-holes 1.

In the conventional electrode layout for three-phase driving described above, however, formation of the through-holes 1 and connection by thin wires are necessary, and at least two conductor layers are necessary for forming the through-holes. Further, since such an electrode arrangement is provided on both slider and stator sides, reduction of the weight of the slider is difficult.

SUMMARY OF THE INVENTION

In order to solve the various problems described above, the present invention provides a planar microactuator in which feed of power to slider electrodes is facilitated, whose reliability is remarkably improved, and by which a subsystem can be reliably realized.

In a planar micro-actuator in accordance with the present invention an insulating fluid is sealed between oppositely disposed stators, there being a predetermined gap between the stators. A slider is movably disposed between the stators. Each of the stators is equipped with power feed paths. The slider is provided with metal bumps, i.e., smooth surface protrusions, in electrical contact with the power feed paths on the stators and power to the slider is fed through the power feed paths and through the metal bumps.

The stators are provided with guide grooves for guiding the metal bumps the guide grooves preferably being formed in the power feed paths. The wiring density can be improved by disposing the power feed path on the electrodes of the stators through an insulating layer. By providing such a structure, any undesirable distortion of the slider can be prevented, and the size and weight of the planar micro-actuator can be reduced.

DESCRIPTION OF THE PREFERRED EMBODIMENTS

Figure 1:
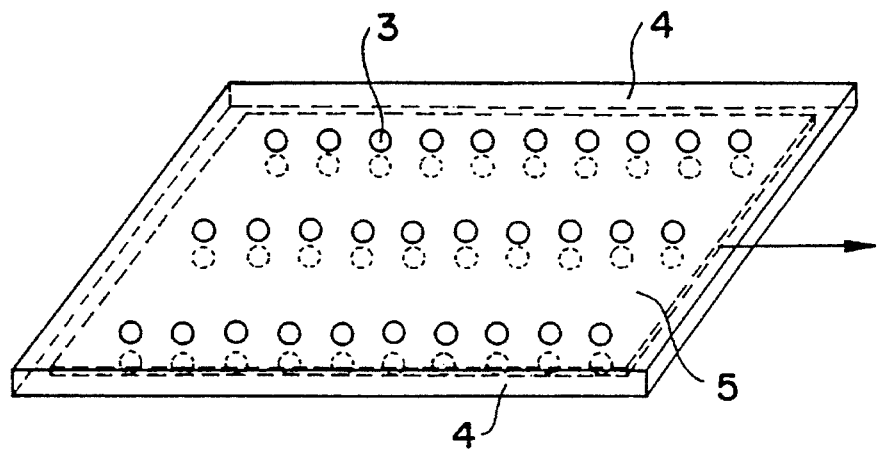
FIG. 1 is a perspective view of a planar micro-actuator according to the present invention.

Hereinafter, a preferred embodiment of the present invention will be described with reference to the accompanying drawings. FIG. 1 is a view showing a conceptual arrangement of stators and a slider of a planar micro-actuator according to the present invention. In FIG. 1A slider 5 is depicted disposed between a pair of spaced stators 4 large number of metal bumps 3, i.e., electrically conductive protrusions, are provided on both surfaces of the slider 5 for the purpose to be described below.

By the above-described arrangement of the stators 4 and the slider 5, the gaps between the stators and between the stators and the slider can be uniform, the contact areas can be reduced, Coulomb friction between the parts can also be reduced, power can be supplied from the stators 4 to the slider 5 through the metal bumps 3, and an integrated planar micro-actuator can be constituted.

Figure 2:
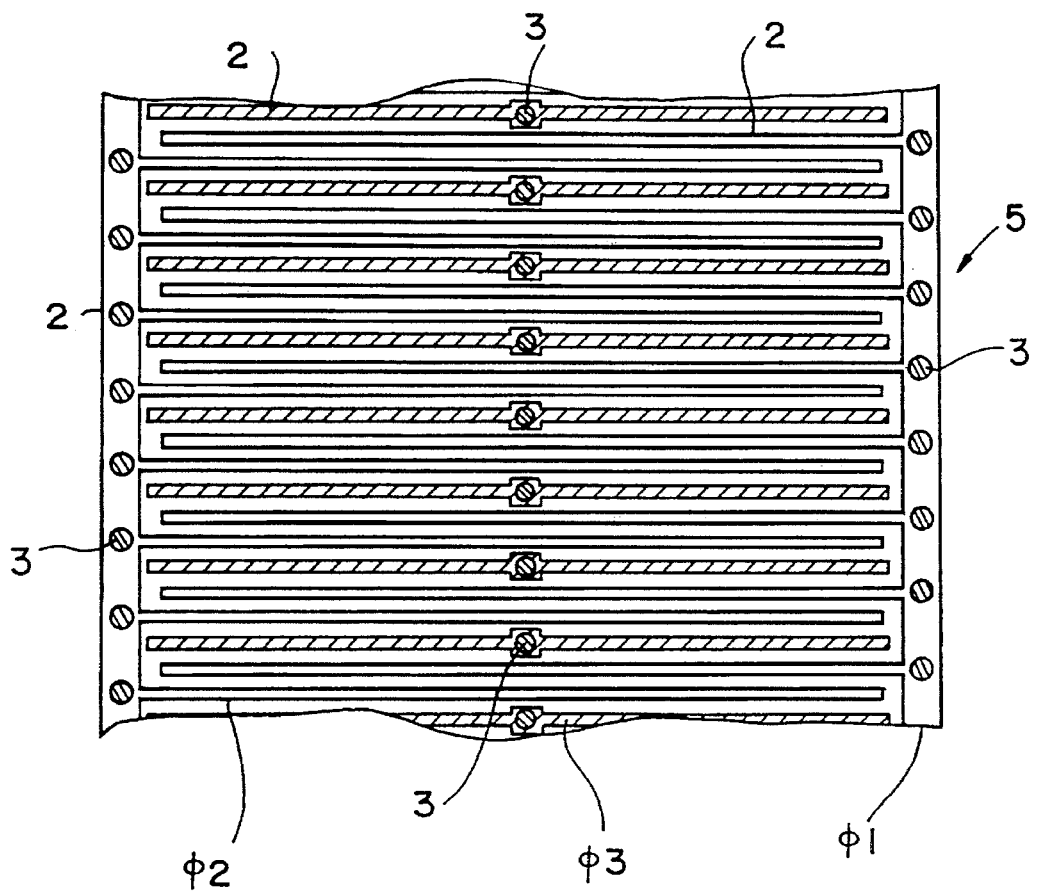
FIG. 2 is a top plan view showing an electrode layout of the slider according to the present invention.

FIG. 2 shows the electrode layout of the slider 5. In FIGS. 2 the symbols φ1, φ2 and φ3 represent the electrodes of three phases. A large number of electrodes 2 extend laterally from the φ1 and φ2 electrodes that extend vertically on both sides. The φ3 electrodes are disposed sequentially and alternately with the φ1 and φ2 electrodes. A metal bump 3 is formed at the center of each of the φ3 electrodes in such a manner as to penetrate the electrode φ3. Metal bumps 3 are also disposed at predetermined intervals on the vertically extending φ1 and φ2 electrodes. These bumps are, as may be seen from FIG. 2, located in alternately staggered positions along opposite sides of the slider in such a manner as to form sliding contacts for power feed of three phases.

Figure 3:
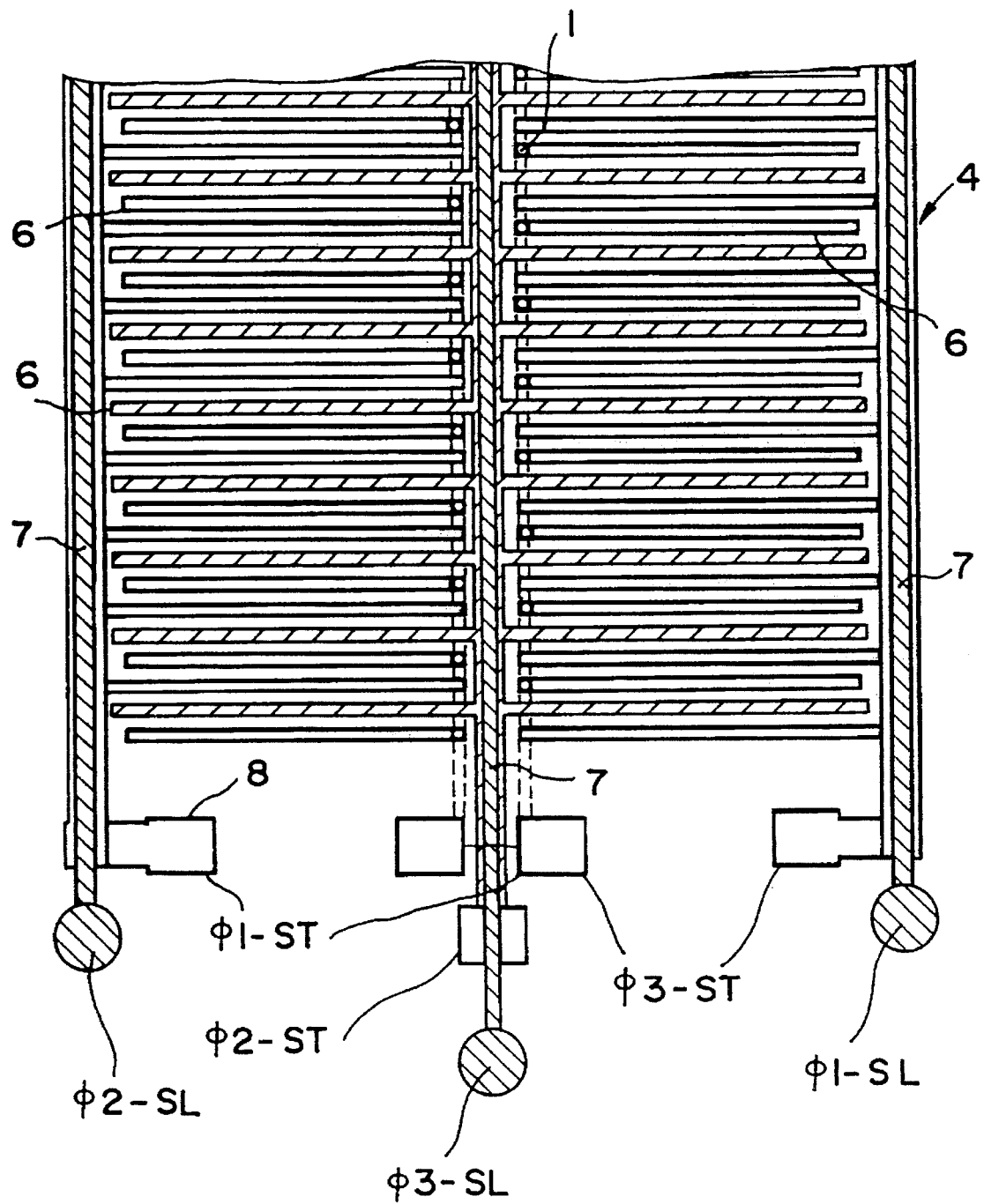
FIG. 3 is a plan view, taken in the same direction as FIG. 2, showing an electrode layout of the stators according to the present invention.

Since the metal bumps 3 on the slider 5 are in direct contact with power feed paths 7 formed at predetermined places on the stator electrodes, see FIG. 3, formation of through-holes and connection by thin wires, which have been necessary in the prior art, can be eliminated, and the need to provide at least two conductor layers can also be eliminated. In other words, the conductive portions of the stator can be a single layer and in consequence, the weight of the slider can be reduced even when the metal bumps 3 are formed.

Figure 4:
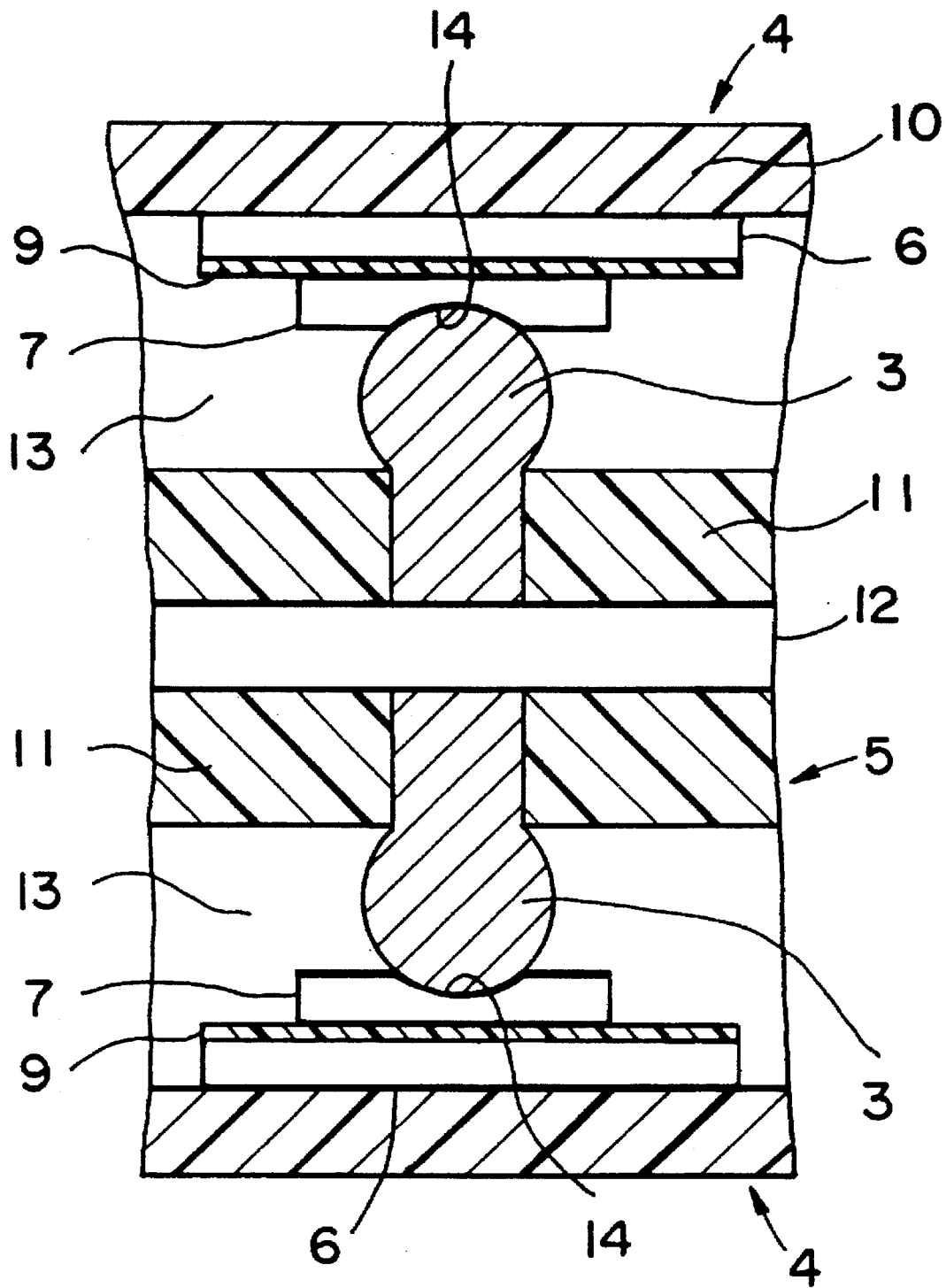
FIG. 4 is a partial, cross-sectional, side-elevational view schematically showing a planar micro-actuator according to the present invention which employs the slider of FIG. 2 as the movable member and stators as shown in FIG. 3 as the fixed position members.
Figure 5:
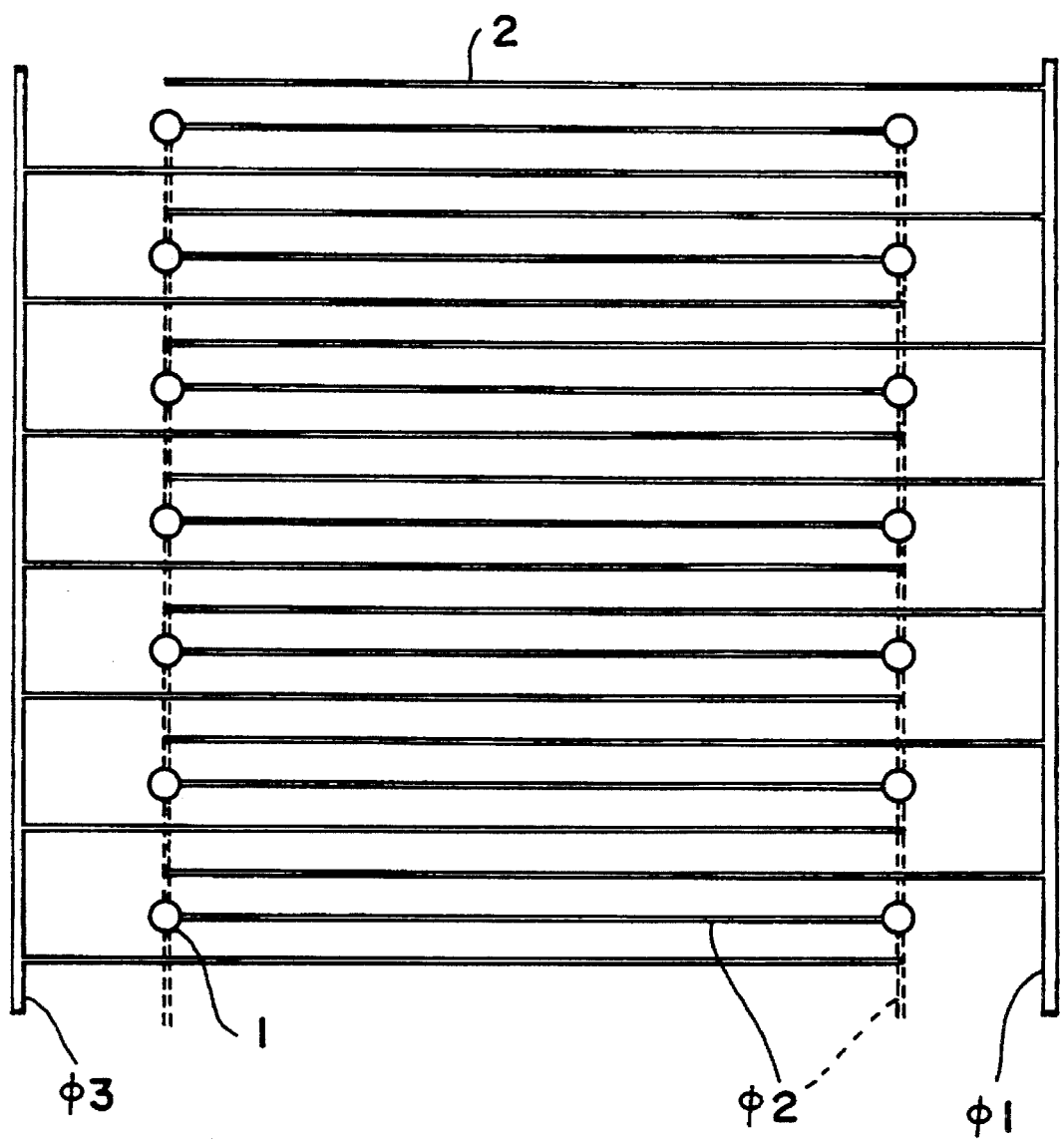
FIG. 5 is a view showing an electrode arrangement of a planar micro-actuator according to the prior art.

FIG. 3 shows the electrode layout of a stator 4. Symbol φ1-ST extending in the vertical direction represents the first longitudinal stator electrode, φ2-ST is the second longitudinal stator electrode and φ3-ST is the third phase longitudinal stator electrode. One of the stator electrodes φ1-ST and φ3-ST is formed at both side positions on the back surface of the φ2-ST electrode as shown by broken lines. A large number of stator electrodes 6 are sequentially formed to extend in the transverse direction from the longitudinal electrodes. Reference numeral 1 denotes the through-holes. Power feed paths 7 for feeding power to the slider through a thin insulating layer are formed in a hybrid structure on the upper surface of the electrodes φ1-ST, φ2-ST and φ3-ST disposed at the center and on both sides of the stators, as also shown in FIG. 4. Each of these power feed paths 7 terminates at a terminal for feeding power to the slider, these terminals being denoted by φ1-SL, φ2-SL and φ3-SL. Reference numeral 8 denotes the electrode terminals disposed at the end portions of the stator electrodes. Since the three-phase terminals of the slider and the stators can be formed in the integrated arrangement as described above, connection of the slider terminals is unnecessary.

FIG. 4 is a partial cross-sectional structural view schematically showing a planar micro actuator according to the present invention. The electrodes 6 of a pair of spatially separated, oppositely disposed stators are shown as formed on insulating substrates 10, and the power feed path 7 are isolated from the electrodes 6 by a thin inter-electrode insulating layer 9 which is formed by a method such as coating of a liquid polyimide resin, etc, or chemical vapor deposition (CVD), as known in the prior art. Guide grooves 14 which are complementary in shape to the bumps 3 are formed in the surface of the power feed paths 7 so as to guide and support the slider 5. Since FIG. 4 is a partial view, it does not show the arrangement of the stator electrodes 6 which may be seen from FIG. 3.

The slider 5 is disposed in the predetermined gap between the stators 4 and includes a surface insulating layer 11 on both surfaces of its electrodes 12. The metal bumps 3, extending from both surfaces of the slider electrode 12, penetrate the surface insulating layers 11 and project outwardly as shown. The engagement of the metal bumps 3 with the guide grooves 14 of the power feed paths 7 constrains movement of the slider to a linear path and prevents its deviation from a generally planar shape. A suitable insulating fluid 13 is sealed into the gap in which the slider moves between the stators.

By the structure described above, power can be fed to the slider electrode 12 through the power feed paths 7 of the stators and through the metal bumps 3 disposed on the slider. Accordingly, any other wirings, etc, are unnecessary.

In the planar micro-actuator according to the present invention, power is fed to the slider through the power feed paths of the stators and through the metal bumps disposed on the slider. Accordingly, adverse influences resulting from viscous resistance to the movement of the slider can be reduced. Further, since direct connection to the external system is not necessary, a sub-system can be easily established.

The guide grooves disposed in the power feed paths of the stators guide the metal bumps of the slider. Therefore, zigzag movement of the slider can be prevented, and the reliability of aligning the electrodes can be improved.

Because the weight of the slider can be reduced, the output per unit weight of such a planar micro-actuator can be improved.

Since the wiring density of the planar micro-actuator can be improved, the size of the device can be minimized. Further, since the planar micro-actuator of the invention may function as a sub-system when integrated with other identical micro-actuators, a macro-system can be constituted by an arbitrary combination of such sub-systems. Accordingly, such an integrated planar micro-actuator is suitable for use in medical equipment, cameras, artificial muscles, and so forth.

What is claimed is:

1. A planar micro-actuator having a pair of spatially displaced stators which at least in part define a sealed gap, said gap being filled with an insulating fluid, a slider movably disposed between said stators in said gap, said stators being provided with electrically conductive power feed paths, said slider having outwardly extending conductive protrusions which are in electrical contact with said power feed paths whereby power may be delivered to said slider through said power feed paths and through said conductive protrusions.

2. A planar micro-actuator according to claim 1, wherein guide grooves for guiding a motion of said slider are formed in said power feed paths, said conductive protrusions being in engagement with said guide grooves.

3. A planar micro-actuator according to claim 1, wherein said stators include electrodes which may be connected to a source of power, and wherein said power feed paths are in registration with some of said stator electrodes and are separated therefrom by insulating layers.

4. A planar micro-actuator according to claim 2, wherein said stators include electrodes which may be connected to a source of power, and wherein said power feed paths are in registration with some of said stator electrodes and are separated therefrom by insulating layers.

5. A planar micro-actuator according to claim 2 wherein said conductive protrusions and said grooves at least in part have complementary shapes.

6. A planar micro-actuator according to claim 4 wherein said conductive protrusions and said grooves at least in part have complementary shapes.

* * * * *